Figure 1:
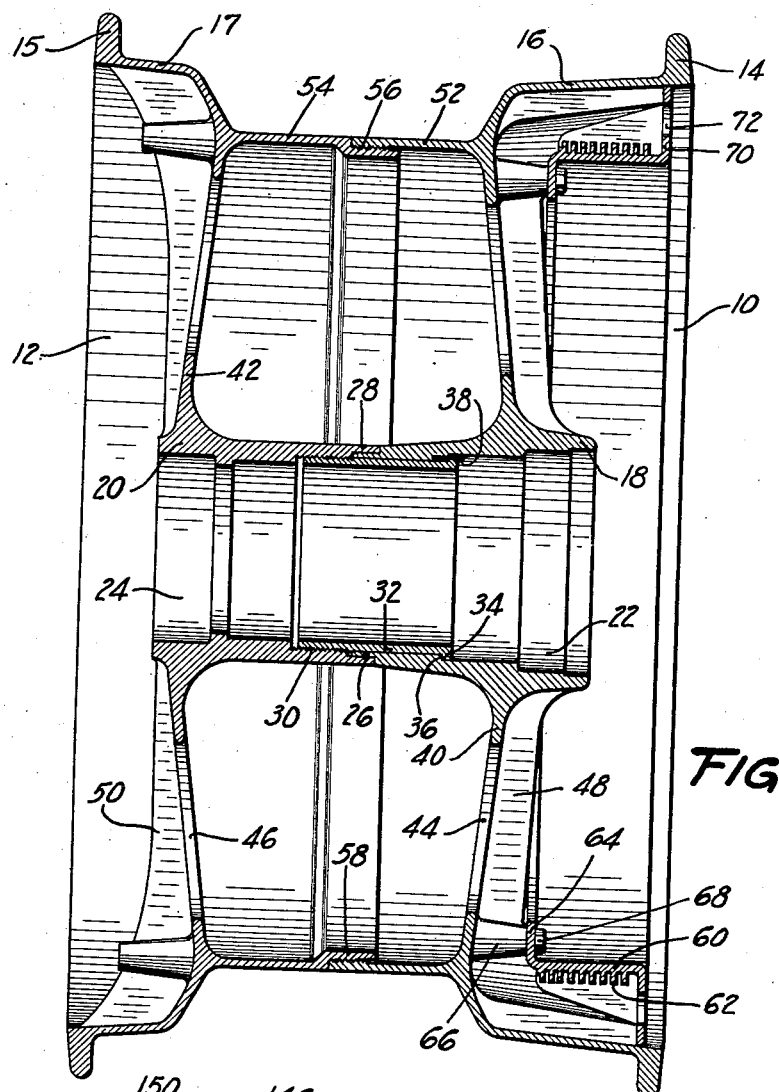

Jan. 11, 1938.   F. C. FRANK   2,105,317
WHEEL
Filed Nov. 19, 1934

INVENTOR.
FREDERICK C. FRANK
BY
Jerome R. Cox
ATTORNEY

Patented Jan. 11, 1938

2,105,317

UNITED STATES PATENT OFFICE 2,105,317

WHEEL

Frederick C. Frank, South Bend, Ind., assignor to Bendix Products Corporation, South Bend, Ind., a corporation of Indiana Application November 19, 1934, Serial No. 753,593

4 Claims. (Cl. 301—6)

This invention relates to wheels, and more particularly to wheels for use in connection with aircraft.

The wheels of aircraft are frequently subjected during normal operation to severe overloads, when the aircraft contacts the ground. It is therefore necessary that the wheels be very strong and incorporate a high factor of safety to avoid serious damage to the aircraft, certain to result from the collapse of a wheel. It is also necessary that the weight of each unit incorporated into an aircraft be kept to a minimum to insure the greatest efficiency and the maximum performance of the aircraft.

An object of this invention is to provide an extremely strong, yet light-weight, wheel adapted especially for use in aircraft.

A further object is to provide a wheel which may be forged or cast of a very light, yet strong, alloy.

Another object is to provide a wheel, especially adapted for use in aircraft, which may be cast in two sections to be fixed together to form the wheel.

Still another object is to provide a two-piece airplane wheel having no extremely thin sections and of a structure such that it may be cast of a light, but very strong, alloy, such as an aluminum magnesium alloy.

A still further object is to provide an airplane wheel designed to be cast in two sections to be fixed together by screw threads, and in which novel means are provided to prevent the two sections from separating.

Yet another object of the invention is to provide a cast airplane wheel having enclosed brake drums and ventilating means to dissipate heat from the drums.

Other objects and advantages of the invention will be apparent from the following detailed description, together with the accompanying drawing, submitted for purposes of illustration only and not intended to define the scope of the invention, reference being had for that purpose to the subjoined claims.

Figure 2:
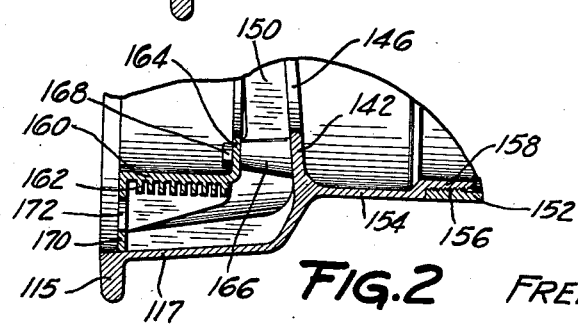

In the drawing:

Figure 1 is a vertical section through an airplane wheel embodying the present invention; and Figure 2 is a fragmentary view showing a modified form of the invention.

As shown in the drawing, the wheel is formed in two complementary main sections 10 and 12. Both sections are designed to facilitate casting, so that each section may be cast in a comparatively simple mold.

Each of the complementary main sections is provided with a flanged member 14 and 15 respectively to engage the sides of a tire (not shown) and hold it in place on the laterally extending rim members 16 and 17 of the wheel. As illustrated, the wheel is preferably of the drop-center type to facilitate removal and replacement of the tire, and to provide a large air space within the tire without unduly increasing the overall dimensions of the tire.

Each of the complementary sections 10 and 12 is provided with a hub portion 18 and 20 respectively, having raceways 22 and 24 respectively to receive anti-friction members, carried by an axle (not shown) to transmit force from the airplane to the ground.

Means are provided to secure the hub portions 18 and 20 together. The outer diameter of a portion of the hub member 18 is decreased to form a tongue 26 adapted to slide within and be engaged by a section of increased internal diameter or projection 28 carried by the hub member 20. The inner surface of the hub portion 20, adjacent the projection 28, is provided with threads 30 to receive a sleeve 32 slidable through the hub portion 18 and provided with a section of enlarged outer diameter or abutment 34 to engage a section of decreased internal diameter or shoulder 36 carried by the hub portion 18 to securely clamp the hub portions 18 and 20 together. The sleeve 32 may be fixed against rotation relative to the hub portion 18 by means such as pins 38 projecting through the abutment 34 and into the shoulder 36. The hub portions 18 and 20 are thus securely locked together.

The hub portions 18 and 20 are joined to the laterally extending rim members 16 and 17 by radially extending discs 40 and 42 respectively. The discs 40 and 42 are provided with a plurality of apertures or cut-out sections 44 and 46 to decrease the weight of the wheel structure. The discs 40 and 42 are further provided with laterally extending reinforcing fins 48 and 50 intermediate the cut-out sections 44 and 46 respectively to increase the strength of the wheel laterally as well as radially.

Each of the complementary sections 10 and 12 is provided with cooperating laterally extending annular portions 52 and 54. The portion 52 is provided on the inside with screw threads 56 to cooperate with the screw threads formed in a projection 58 carried by the portion 54.

The screw threads fixing the members 52 and 54 together are preferably right-hand threads of a pitch different from and not divisible into or a multiple of the pitch of the screw threads fixing the sleeve 32 to the hub portion 20, which is preferably a left-hand thread.

The section 10 of the wheel is provided with an enclosed brake drum 60 having radially extending cooling flanges 62 to dissipate heat from the drum 60. The drum 60 is provided with a radial inwardly extending flange 64 to permit the drum 60 to be clamped by means of bolts 68 to bosses 66 formed on the fins 48.

The drum 60 is provided with a radially extending flange 70 to coact with the rim member 16 to aid in supporting the drum 60. The flange 70 is provided with apertures 72 to permit air to flow through the space between the drum 60 and the rim section 16. Air is thus permitted to circulate around the brake drum 60 and through the cut-out sections 44 to dissipate heat from the brake drum 60.

Figure 2 shows an alternative construction wherein dual brakes may be employed if the effective braking area of the single brake drum 60 of Figure 1 is insufficient to adequately handle the load imposed upon it. The section 12 of the wheel may be fitted with a brake drum 160, similar to the brake drum 60 carried by the section 10. The drum 160 is provided with a plurality of outwardly extending cooling flanges 162, and an inwardly extending flange 164 to permit the drum 160 to be clamped by means of the bolts 168 to the bosses 166 formed on the fins 148.

The drum 160 is further provided with a radially extending flange 170 to coact with the rim member 117 to aid in supporting the drum 160. The flange 170 is formed with a plurality of apertures 172 to permit air to flow through the space between the drum 160 and the rim section 117. The brake drum 160 is thus cooled by the circulation of air through the cut-out sections 146 and over the cooling flanges 162 of the drum 160.

The invention thus comprehends the provision of an airplane wheel so designed and constructed that it may be cast or forged in two main sections, of an extremely light, but very strong, alloy, such as an aluminum magnesium alloy. Novel means is also provided for fixing the two main sections of the wheel together.

While the invention has been described with particular reference to a preferred embodiment, it is not intended to limit the scope of the invention to the embodiment illustrated, nor otherwise than by the terms of the subjoined claims.

I claim:

1. A drop-center airplane wheel comprising two main cast sections, a hub portion carried by each section, screw threads formed in a portion of one of said hub sections, locking means including a threaded sleeve having an abutment slidable through a portion of the other of said hub sections and engaging the threads in said hub section, and means including a pin to lock the sleeve against rotation, relative to said other hub section.

2. A wheel comprising two main cast sections having hub portions and rim portions, the latter having a screw threaded connection, screw threads formed in a portion of one of said hub sections, locking means including a threaded sleeve having an abutment slidable through a portion of the other of said hub sections and engaging the threads in said hub section, means including a pin to lock the sleeve against rotation relative to the other of said hub sections, said hub and sleeve threads being of a pitch different from and not divisible into or a multiple of the pitch of the screw threads carried by said rim portions.

3. A drop-center airplane wheel comprising two separate main sections, hub and rim portions carried by each main section, a screw thread carried by one of said hub portions, a tire engaging flange carried by each section, means to fix the two main sections together, said means including cooperating screw threads carried by each main section remote from said flanges and a sleeve threaded into said one of said hub portions at the midsection of the wheel and engaging the other of said hub portions, and means to lock said sleeve against rotation with respect to said one of said portions, said screw threads being of a different pitch.

4. A drop center airplane wheel comprising two separate main sections, hub and rim portions carried by each main section, a screw thread carried by one of said hub portions, a tire engaging flange carried by each section, means to fix the main sections together, said means including cooperating screw threads carried by each main section remote from said flanges, and a sleeve threaded into said one of said hub portions at the mid section of the wheel and engaging the other of said hub portions, and means to lock said sleeve against rotation with respect to said one of said portions, said screw threads being oppositely turned.

FREDERICK C. FRANK.